Oct. 21, 1958  R. C. GIPE ET AL  2,856,831
HIGH SPEED LIGHT BEAM SHUTTER MECHANISM
Filed Sept. 16, 1953  2 Sheets-Sheet 1
FIG. 1.
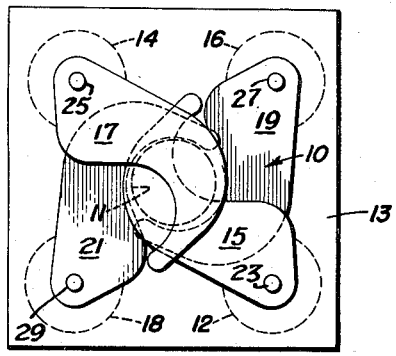
FIG. 2.
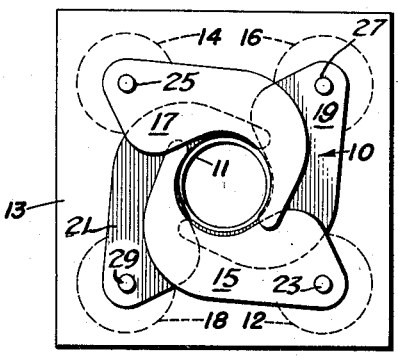
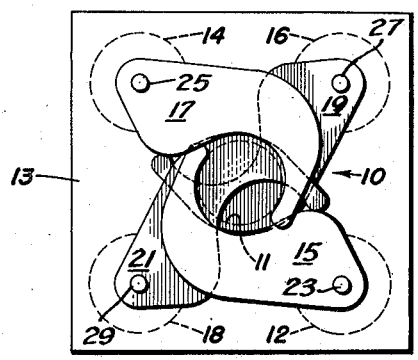
FIG. 3.
ROBERT C. GIPE
PAUL C. MAYBURY
INVENTORS
BY
ATTORNEYS

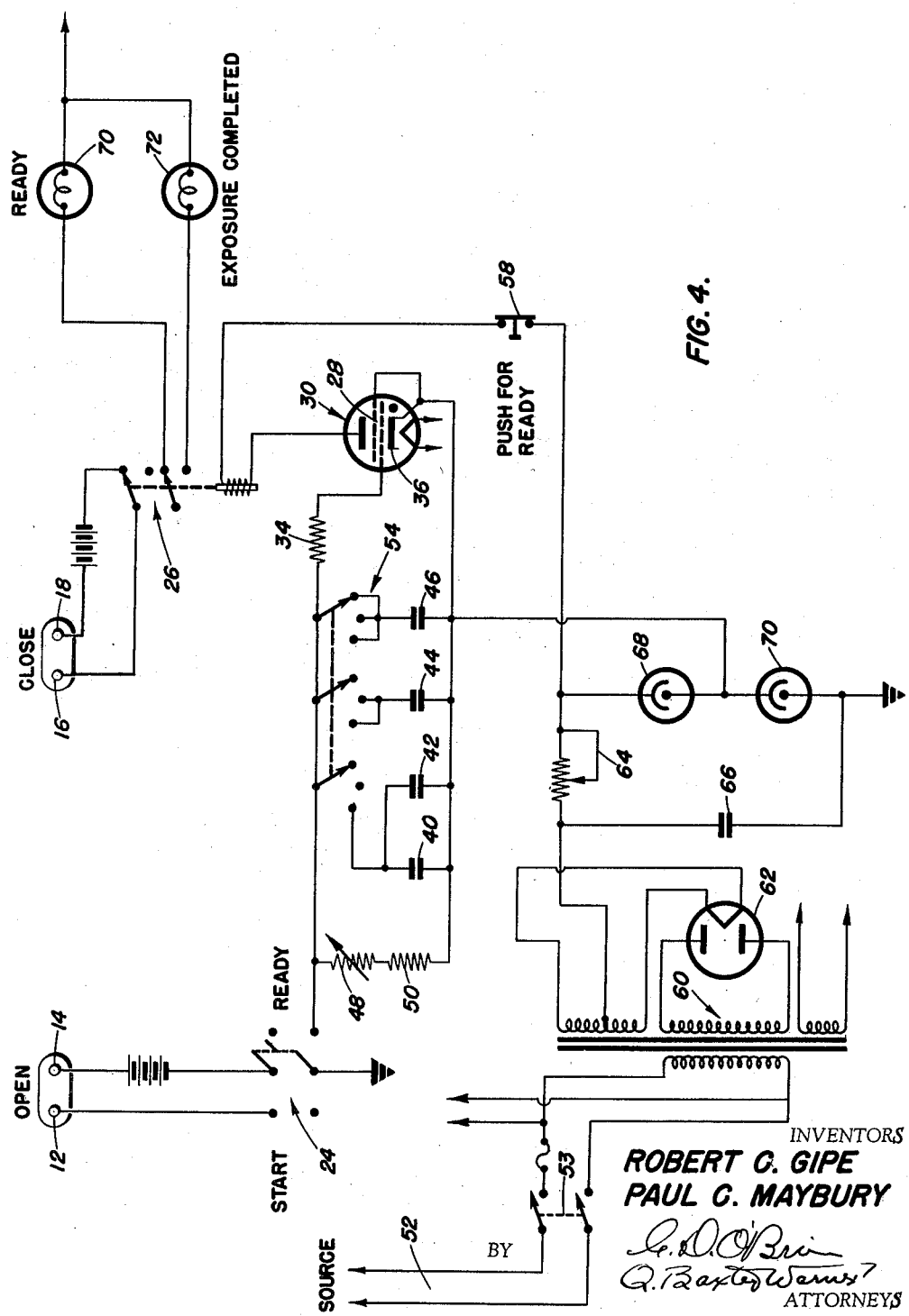

United States Patent Office 2,856,831
Patented Oct. 21, 1958

2,856,831

HIGH SPEED LIGHT BEAM SHUTTER MECHANISM

Robert C. Gipe, Hyattsville, and Paul C. Maybury, Pikesville, Md., assignors to the United States of America as represented by the Secretary of the Navy Application September 16, 1953, Serial No. 380,626

1 Claim. (Cl. 95—62)

This invention relates generally to a high speed light beam shutter. More particularly, this invention pertains to a fast moving shutter with variable timing.

Certain characteristics of materials are determined by exposing a sample to an intense beam of light for various controlled intervals. This exposure interval is controlled by turning a light beam on and off.

It is an object of this invention to provide a variable shutter timer for accurately controlling a light shutter which interrupts a light beam.

It is another object of this invention to provide a high speed shutter arrangement which operates at speeds of two (2)–three (3) milliseconds action time on opening and closing strokes.

These objects and many of the attendant advantages of this invention will be readily appreciated as the same becomes better understood by reference to the following detailed description when considered in connection with the accompanying drawings, and in which:

Fig. 1 is a schematic of a shutter arrangement, showing the shutter in a closed position;

Fig. 2 is a schematic similar to Fig. 1, showing the shutter in an opened position;

Fig. 3 is a schematic similar to Figs. 1 and 2, showing the shutter in an alternate closed position; and Fig. 4 is a schematic of the circuitry for the variable shutter timer arrangement of Fig. 1.

In accordance with the invention, a high speed shutter arrangement is provided for opening and closing an aperture. This shutter arrangement includes structure which has an aperture therein, two pairs of blade members, with the blades of each pair of blade members being arranged to open and close the aperture. An electrical circuit is provided for the shutter arrangement and it has located therein a conventional rotary type solenoid for each blade member. These solenoids are so arranged that each alternate pair of solenoids actuates its corresponding pair of blade members to alternately open and close the aperture. Additional means can be provided in the circuit for varying the exposure time of the shutter arrangement.

Referring now to Figs. 1, 2 and 3, there is shown a shutter arrangement 10 which was designed to operate at speeds of two (2)–three (3) milliseconds action time on opening and closing strokes for opening and closing an aperture 11 provided in a structure 13. In order to obtain this desired time, four rotary type solenoids 12, 14, 16 and 18 are utilized. These solenoids are of the conventional type and are similar to the rotary type solenoid or electromagnet illustrated in Figs. 5–13, sec. 5–46, of the Standard Handbook for Electrical Engineers, Eighth Edition, 1948, published by McGraw-Hill Book Co. Inc. The rotary solenoid shafts 23 and 25 of solenoids 12 and 14 are mechanically coupled to spring steel blades 15 and 17. These blades are .007" thick. These blades 15 and 17 are actuated to open the aperture or area 11, as shown in Fig. 2. Solenoids 12 and 14 were designed to have a stroke radius of 25 degrees. By means of this arrangement, the blades 15 and 17 are required to travel only a minimum distance.

While blades 15 and 17 are open, a second electrical pulse which is controlled electronically, actuates solenoids 16 and 18, which likewise have spring steel blades 19 and 21, respectively, mechanically coupled thereto by the rotary solenoid shafts 27 and 29. These blades 19 and 21 are .007" thick. These blades 19 and 21 are operated to close the aperture or area 11 in the same time as it took to open the aperture or area 11, and as shown in Fig. 3. By means of this solenoid-blade arrangement, it is possible to obtain very short exposure times with extremely short operating time. The diameter of the aperture or area 11 can be any desirable dimension, but in the present instance it is approximately 1½".

As previously indicated, the light shutter arrangement 10 is opened by energizing a pair of solenoids 12 and 14, and it is closed by energizing a second pair of solenoids 16 and 18. The opening solenoids 12 and 14 are controlled by a "start" switch 24, as shown in Fig. 4. This switch 24, which is of the toggle type, also starts the timing sequence and after a certain predetermined interval a relay 26, which controls the pair of closing solenoids 16 and 18, is energized.

With switch 24 in the "ready" position, grid 28 of a 2D21 tube 30 is at ground potential through a 5K 2 W. resistor 34 and the cathode 36 of tube 30 is plus seventy-five (75) volts above ground. The grid 28 is therefore minus seventy-five (75) volts with respect to the cathode 36 and the tube 30 is prevented from firing. When switch 24 is thrown from the "ready" position to "start" position, the grid 28 is ungrounded.

The grid bias of minus seventy-five (75) volts does not immediately fall to zero because of the time required for condensers 40, 42, 44 and 46 (25, 10, 4 and 0.5 mfd., respectively) in the grid circuit of the tube 30 to discharge. These condensers 40, 42, 44 and 46 discharge around thru a 30K potentiometer 48 and a 3K 2 W. resistor 50.

A suitable A. C. power source 52 controlled by a double pole, single throw toggle switch 53 is provided in the circuit, and it is connected to a power supply transformer 60, which is utilized for supplying A. C. power to the plates of a 5Y3 rectifier tube 62. Rectifier tube 62 is connected through a 4K 10 W. resistor 64 and a 16 mfd., 450 volt condenser 66 to two standard voltage regulator tubes 68 and 70, which are used for stabilizing the voltage. These tubes 68 and 70, in turn, are connected to a three pole, three throw wafer switch 54 and a push button switch 58.

The discharge time, and, hence, the time interval is varied by varying the resistor 48 or by varying the grid circuit capacitance. The capacitance is varied by means of switch 54. After the grid voltage has fallen to a few volts, tube 30 fires and causes the relay 26 to operate. Relay 26 operates the "close" solenoids 16 and 18. A ready indicator lamp 70, and an exposure completed indicator lamp 72 are connected to the relay 26, and are utilized to tell when the circuit is ready for operation and the exposure period is completed, respectively.

To reset the circuit, it is necessary to return the grid bias by throwing switch 24 to the "ready" position, and then momentarily removing the plate voltage on the tube 30 by opening the switch 58 for a few seconds. This allows the tube 30 to de-ionize and the circuit is then ready for another cycle.

Obviously many modifications and variations of the present invention are possible in the light of the above teachings. It is therefore to be understood that within the scope of the appended claim, the invention may be practiced otherwise than as specifically described.

What is claimed is:

A high speed shutter arrangement for interrupting the radiation from a source, comprising, a plate having an aperture extending therethrough, two pairs of blade members, each blade member being integrally mounted on a shaft for rotation with said shaft, two pairs of rotary solenoids, one solenoid being provided for each of said shafts for imparting rotary motion thereto, said blade members being adapted for operation in pairs alternately to open and close said apertures in response to a signal which energizes said rotary solenoids in order that as one pair of blade members opens said aperture, the second pair of blade members closes said aperture after a subsequent controllable time interval.

References Cited in the file of this patent

UNITED STATES PATENTS

| | | |
|---|---|---|
| 386,449 | Bliss et al. | July 24, 1888 |
| 709,837 | Wheeler | Sept. 23, 1902 |
| 1,291,964 | McCormick | Jan. 21, 1919 |
| 1,377,366 | Rose | May 10, 1921 |
| 1,444,365 | Bowes | Feb. 6, 1923 |
| 1,483,465 | Marks | Feb. 12, 1924 |
| 2,354,168 | Aiken | July 18, 1944 |
| 2,359,116 | Johnson | Sept. 26, 1944 |
| 2,463,206 | Robertson | Mar. 1, 1949 |
| 2,496,880 | Leland | Feb. 7, 1950 |
| 2,577,774 | Lee | Dec. 11, 1951 |
| 2,691,331 | Wilcox | Oct. 12, 1954 |

FOREIGN PATENTS

| | | |
|---|---|---|
| 370,380 | Italy | Apr. 14, 1939 |